US010969774B2

(12) United States Patent
Hollender et al.

(10) Patent No.: US 10,969,774 B2
(45) Date of Patent: Apr. 6, 2021

(54) COMPUTER SYSTEM AND METHOD FOR MONITORING THE TECHNICAL STATE OF INDUSTRIAL PROCESS SYSTEMS

(71) Applicant: ABB Schweiz AG, Baden (CH)

(72) Inventors: Martin Hollender, Dossenheim (DE); Benjamin Kloepper, Mannheim (DE); Michael Lundh, Vaesteras (SE); Moncef Chioua, Heidelberg (DE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/576,832

(22) Filed: Sep. 20, 2019

(65) Prior Publication Data

US 2020/0012270 A1 Jan. 9, 2020

Related U.S. Application Data

(63) Continuation of application No. PCT/EP2018/056445, filed on Mar. 14, 2018.

(30) Foreign Application Priority Data

Mar. 24, 2017 (EP) ..................... 17162852

(51) Int. Cl.
*G06G 7/00* (2006.01)
*G05B 23/02* (2006.01)
*G05B 13/04* (2006.01)
*G06N 20/10* (2019.01)

(52) U.S. Cl.
CPC ......... *G05B 23/0229* (2013.01); *G05B 13/04* (2013.01); *G06N 20/10* (2019.01)

(58) Field of Classification Search
CPC .. G05B 13/04; G05B 23/0229; G05B 23/024; G06N 20/10
See application file for complete search history.

(56) References Cited

U.S. PATENT DOCUMENTS

| 9,355,007 B1* | 5/2016 | Eicher ................. G06F 11/3428 |
| 2010/0223277 A1* | 9/2010 | Yamaguchi ........ G05B 19/4184 |
| | | 707/769 |
| 2011/0087517 A1* | 4/2011 | Abbott .................... G06F 30/17 |
| | | 705/7.28 |
| 2012/0150335 A1 | 6/2012 | Prabhu et al. |

(Continued)

FOREIGN PATENT DOCUMENTS

WO WO 2011034805 A1 3/2011

*Primary Examiner* — Luis A Sitiriche
(74) *Attorney, Agent, or Firm* — Leydig, Voit & Mayer, Ltd.

(57) ABSTRACT

An anomaly detection module is configured to apply a plurality of machine learning models to received technical status data to detect one or more indicators of an abnormal technical status prevailing in the industrial process system. The plurality of machine learning models are trained on historic raw or pre-processed sensor data and the anomaly detection module configured to generate the anomaly alert based on the one or more indicators. The received technical status data is assigned to signal groups and the generated anomaly alert is a vector with each vector element representing a group anomaly indicator for the respective signal group. Each vector element is determined by applying a respective group specific machine learning model.

14 Claims, 6 Drawing Sheets

(56) References Cited

U.S. PATENT DOCUMENTS

| | | | |
|---|---|---|---|
| 2012/0304008 A1* | 11/2012 | Hackstein | G05B 23/0229 |
| | | | 714/26 |
| 2016/0320768 A1 | 11/2016 | Zhao et al. | |
| 2016/0330225 A1* | 11/2016 | Kroyzer | G06N 20/00 |
| 2017/0249562 A1* | 8/2017 | Garvey | G06N 20/00 |
| 2018/0247220 A1* | 8/2018 | Assem Aly Salama | |
| | | | G06N 20/00 |

* cited by examiner

COMPUTER SYSTEM AND METHOD FOR MONITORING THE TECHNICAL STATE OF INDUSTRIAL PROCESS SYSTEMS

CROSS-REFERENCE

This application is a continuation of International Patent Application No. PCT/EP2018/056445, filed on Mar. 14, 2018, which claims priority to European Patent Application No. EP 17 162 852.2, filed on Mar. 24, 2017. The entire disclosure of both applications is hereby incorporated by reference herein.

FIELD

The present invention generally relates to state monitoring of industrial process systems, and more particularly, relates to methods, computer program products and systems for controlling advanced process controllers.

BACKGROUND

Many technical systems are monitored via sensors which sense technical parameters of the technical systems reflecting the technical state. In industrial process systems, often such sensor values provide input for advanced process control units (APC)—also referred to as advanced process controllers—which can compute set-points for low level controllers (LLC) to control actuators of the industrial process system in operation. "Industrial process system" as used herein refers to a technical system having an operation for processing gas, liquid, or solid flow materials. Thereby, "process flow system" does not only include process manufacturing systems but also includes systems such as ventilation systems (e.g., for an underground mine) or other systems where the main purpose is the transport of liquids, gas or solid flow materials (e.g., bulk materials). APC solutions are commercially available (e.g., the APC solution offered by ABB as described in the publication "Advanced Process Control—The proven way to process optimization" available at: https://library.e.abb.com/public/fa34b897958489a9c1257ad7005753d5/Brochure_APC_low.pdf).

In control theory advanced process control refers to a broad range of techniques and technologies implemented within industrial process control systems. Typically, advanced process controls are deployed in addition to basic process controls. Basic process controls are designed and built with the process itself, to facilitate basic operation, control and automation requirements. Advanced process controls are typically added subsequently to address particular improvement opportunities in the process. Known types of advanced process control include but are not limited to:

Advanced regulatory control (ARC) refers to several proven advanced control techniques, such as feedforward, override or adaptive gain. ARC is also a catch-all term used to refer to any customized or non-simple technique that does not fall into any other category. ARCs are typically implemented using function blocks or custom programming capabilities at the DCS (distributed system control) level.

Multivariable Model predictive control (MPC) is a technology typically deployed on a supervisory control computer that identifies important independent and dependent process variables and the dynamic relationships (models) between them. It uses matrix-math based control and optimization algorithms, to control multiple variables simultaneously. One requirement of MPC is that the models are to be linear (i.e. they must be repeatable at all points of the operating range of the controller).

Inferential Measurements: The concept behind inferentials is to calculate a stream property from readily available process measurements, such as temperature and pressure, that otherwise would require either an expensive and complicated online analyzer or periodic laboratory analysis. Inferentials can be utilized in place of actual online analyzers, whether for operator information, cascaded to base-layer process controllers, or multivariable controller CVs.

Sequential control refers to dis-continuous time and event based automation sequences that occur within continuous processes. These may be implemented as a collection of time and logic function blocks, a custom algorithm, or using a formalized Sequential function chart methodology.

Compressor control typically includes compressor antisurge and performance control.

Nonlinear MPC: Similar to Multivariable MPC in that it incorporates dynamic models and matrix-math based control. However, it does not have the requirement for model linearity. Nonlinear MPC is capable of accommodating processes with models that have varying process gains and dynamics (i.e. dead-times and lag times).

SUMMARY

In an embodiment, the present invention provides a computer system for monitoring the technical status of an industrial process system under control of an advanced process controller. The industrial process system has an operation part for processing flow materials. The advanced process controller is responsive to one or more sensor signals. The computer system includes an interface module and an anomaly detection.

In an embodiment, the interface module is configured: to receive technical status data describing the current technical state of the industrial process system with regards to a respective processing component or the processed material, where the technical status data corresponds to or is derived from the one or more sensor signals, and to output an anomaly alert configured to enable deactivating of the advanced process controller in case of an anomaly detection for the industrial process system.

In an embodiment, the anomaly detection module is configured to apply a plurality of machine learning models to the received technical status data to analyze the technical status data for detecting one or more indicators of an abnormal technical status prevailing in the industrial process system. The plurality of machine learning models are trained on historic raw or pre-processed sensor data. The anomaly detection module is configured to generate the anomaly alert based on the one or more indicators.

In an embodiment, the received technical status data is assigned to signal groups and the generated anomaly alert is a vector with each vector element representing a group anomaly indicator for the respective signal group. Each vector element is determined by applying a respective group specific machine learning model. Signal groups are defined by any one of the following grouping criteria: grouping based on physical location of the respective signals within the industrial process system, grouping of correlated signals identified by correlation analysis, and grouping of signals with dependencies as a result of domain knowledge.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Advanced Process Control Units (APCs) compute the set-points for the low level (basic) controllers of the industrial process system based on measurement data received from sensors overserving the operation of the industrial process system. For examples, such sensor data may refer to a direct feedback on an actuator function in response to a LLC (e.g., temperature value in response to a heater function) or the sensor data may refer to the properties of the flow material (e.g., composition of the material, purity, etc.). Typically, the computation of set-points by the APC is very sensitive to the received measurement values as inputs to the APC computation. It may occur that a particular sensor value is completely wrong either because of some unforeseen disturbance of the measurement or because the sensor is broken. For example, a temperature sensor may provide a temperature value of −20° C. instead of +20° C. This may cause the APC to compute entirely wrong set-points for the LLCs of the industrial process system which can lead to complete failure of the industrial process system operation because actuators of the system are controlled in a totally unreasonable manner. In other words, in such situations the control loop function implemented through ABC and LLCs is disturbed.

For example, a flotation process for mineral enrichment may be controlled by an MPC with measurements of the mineral concentrate in several locations. These measurements can be based on x-ray analysis and are typically performed using the same analyzer. Samples are pumped in pipes to a central analyzer. From time to time, these pipes may be clogged and may cause the MPC to take wrong decisions when clogging occurs. A problem may occur when the measured value differs from its set-point because the controller then increases the control signals to decrease the measured difference. Since the sensor value does not move as expected the control signals will drift and take the process into a bad technical state. Another scenario which may occur is that the x-ray sensor is not completely washed between samples. Therefore, the previous sample influences the current measurement. Since samples come from different parts of the process with significantly different levels, influence from earlier samples may cause fluctuations in the measurements, on which the controller will act.

A further example is a (process flow) system for ventilation of an underground mine. It may be controlled by an MPC. Such a system typically has sensors for air-flow in different locations, and further has pressure sensors located in the proximity of the fans. A mine is a very harsh environment with lot of dust that can negatively affect the sensors. Further, often the airflow sensors are located in drive ways where there is a potential risk that they are hit by a truck or any other passing machinery. An erroneous pressure sensor over a fan may fail to constrain the fan in its allowed operating range. This may cause the fan to stall with the consequence that the model no longer describes the real system and the controller will no longer optimize the process for ventilating the mine.

Therefore, a need exists to provide means for preventing APCs from computing set-points for LLCs which take industrial process system operation at risk in response to sensor data of low quality (i.e. sensor data which do not reflect the real technical status of the system operation). In an embodiment, this technical problem is solved by embodiment in the form of computer system, computer-implemented method and computer program product according to the independent claims.

In an embodiment, a computer system is provided for monitoring the technical status of an industrial process system being under control of an advanced process controller APC. The industrial process system has an operation for processing gas, liquid or solid flow materials. The operation of the industrial process system, as used herein, includes processing components and the processed flow material(s). Processing components include actuators, sensors, and passive flow material processing components (e.g., tubes, tanks, etc.). The APC is responsive to one or more sensor signals. The computer system has an interface module to receive technical status data describing the current technical state of the industrial process system with regards to a respective processing component or the processed material. The technical stats data can correspond the one or more sensor signals. In other words, the technical status data may be raw sensor data received directly from the industrial process system.

In an embodiment, the raw sensor data may be preprocessed by a pre-processor module and the pre-processed data is received as the technical status data. The pre-processor can be a module operated by a computing device outside the computer system. A person skilled in the art is also capable to implement the pre-processor as an integral part of the computer system.

In an embodiment, the technical state of the industrial process system is defined as the aggregate of the technical states of its processing components and the technical state of the flow material(s). Standard interface technology (e.g., OPC Data Access, OPC Unified Architecture) can be used for the communicative coupling of the computer system with the industrial process system to enable the exchange of data.

The computer system further has an anomaly detection module to apply one or more Machine Learning Models to the received technical status data to analyze the technical status data for detecting one or more indicators of an abnormal technical status prevailing in the industrial process system. The Machine Learning Models can be generated and stored by the computer system itself or they may be provided by an external computer system (e.g., by a remote server computer such as a cloud computer). The one or more Machine Learning Models are trained on historic raw or pre-processed sensor data which were previously generated by sensors of the industrial process system.

It is to be noted that in case the anomaly detection works on raw data also the corresponding Machine Learning Model(s) are trained on corresponding historic raw data. If the anomaly detection works on pre-processed data (technical status data derived from the raw sensor signals) also the corresponding Machine Learning Model(s) are trained on the corresponding historic pre-processed sensor signals. The pre-processor may derive any one of the following features from the raw sensor signals: average, max, min, variance, skewness, kurtosis, median, k-peaks, location of maximum, location of minimum.

During the training phase the Machine Learning Model(s) learn the normal behavior of the industrial process system. The anomaly detection analysis may be based on any one of the following algorithms: k-nearest neighbor, local outlier detection, fuzzy logic based outlier detection, Multilinear Principal Component Analysis, multi-variate Gaussian distribution, one-class support vector machine, replicator neural networks, self-organizing maps, Multilinear Principal Component Analysis, deviations from association rules, and deviations from frequent item-sets. If one or more indicators of an abnormal technical status are detected the anomaly detection module generates an anomaly alert based on the one or more indicators. The anomaly alert is configured to enable deactivating of the APC in case of an anomaly detection for the industrial process system and is provided as output via the interface module to an operator of the industrial process system or directly to the industrial process system. In cases where an industrial process system is controlled by multiple APCs where the various APCs are sensitive to different sets of sensor signals, only the APCs affected by the anomaly may be deactivated.

In other words, in an embodiment the anomaly alert is provided to a human operator of the industrial process system to present the abnormal technical status of the industrial process system with the intention that the operator takes corrective action by deactivating the APC. In another embodiment, a machine readable instruction is directly sent to the industrial process system where it can be executed to deactivate the APC automatically.

The computer system may further have a post-processor module to determine one or more root causes amongst the received one or more technical status data. The one or more root causes indicate the origin(s) for the anomaly alert in the industrial process system. Other methods can be used to determine the root cause.

In an embodiment, density based screening may be used where sensor data samples showing anomalies are compared with samples showing no anomalies to identify the most deviating dimensions as root cause signals. In an alternative embodiment, scoring anomaly detection applied to groups of signals and/or single signals can be used to generate a list of most likely root cause signals.

In an embodiment, the received technical status data is assigned to one or more signal groups and the generated anomaly alert is a vector with each vector element representing a group anomaly alert for the respective signal group. Thereby, each vector element is determined by applying a respective group specific Machine Learning Model to the received technical status data. The grouping of technical status data into signal groups can be performed according to various grouping criteria, including but not limited to: grouping based on physical location of the respective signals within the industrial process system, grouping of correlated signals identified by correlation analysis, grouping of signals with dependencies as a result of domain knowledge.

Using signal groups with dedicated Machine Learning Models allows to identify potential origins of an anomaly at the level of signal groups. That is, the granularity for anomaly detection at group level is higher than in a situation where a single Machine Learning Model is applied to all received signals. Although a single Machine Learning Model knowing all dependencies between all received sensor signals is most powerful to detect an anomaly of the industrial process system, it is weak with regards to the granularity in terms of root cause resolution. Because there is only one anomaly indicator for the whole system it does not give a hint on the origin(s) behind the anomaly. When using signal grouping with respective Machine Learning Models per group the overall power to detect an anomaly is reduced because each Machine Learning Model only knows about the signal dependencies within the respective group. However, intelligent grouping along the above given grouping criteria still provides good results with regards to the anomaly detection. The advantage when using signal grouping is that once a particular Machine Learning Model detects an anomaly indicator for the respective group, it is automatically known that the root cause for the anomaly is in the corresponding group. This facilitates root cause analysis for the operator of the industrial process system. Only such processing components/flow materials affecting any of the sensor signals in the signal group showing the anomaly need to be checked.

In an embodiment, the computer system further has a threshold evaluator module to store an upper threshold value and a lower threshold value per received technical status data for one or more of the respective sensor signals. The threshold evaluator compares the received technical status data with the threshold values, and generates, irrespective of the evaluation by the anomaly detection module, an anomaly indicator for a particular technical status data if the respective data value falls outside the interval defined by the respective upper and lower thresholds. In other words, threshold-based sensor data evaluation can provide a shortcut to the detection of an anomaly indicator. If a particular technical status data value lies outside the tolerance range defined by the upper lower thresholds immediately a corresponding anomaly indicator is detected no matter what the outcome of the Machine Learning Model based evaluation provides. For example, the threshold values may be pre-defined (e.g., by an operator) based on prior experience, or the threshold values may be learned by the respective Machine Learning Models from the historic sensor data.

In an embodiment, a computer-implemented method is provided for monitoring the technical status of an industrial process system being under control of an APC, the APC being responsive to one or more sensor signals. The method includes receiving technical status data describing the current technical state of the industrial process system with regards to a respective processing component or the processed material wherein the technical status data corresponds to or is derived from the one or more sensor signals; applying one or more Machine Learning Models to the received technical status data to analyze the technical status data for detecting one or more indicators of an abnormal technical status prevailing in the industrial process system wherein the one or more Machine Learning Models are trained on historic raw or pre-processed sensor data; generating an anomaly alert based on the one or more indicators, the anomaly alert configured to enable deactivating of the advanced process controller; and outputting the anomaly alert to an operator of the industrial process system or to the APC.

In an embodiment, the method further includes determining one or more root causes amongst the received one or more technical status data. The one or more root causes indicating the origin for the anomaly alert in the industrial process system are determined by any one of the previously disclosed methods.

In an embodiment, the received technical status data are assigned to one or more signal groups and the generated anomaly alert is a vector with each vector element representing a group anomaly alert for the respective signal group wherein each vector element is determined by applying a respective group specific Machine Learning Model. The grouping of signals into signal groups may be based on any one of the following grouping criteria: grouping based on physical location of the respective signals within the industrial process system, grouping of correlated signals identified by correlation analysis, grouping of signals with dependencies as a result of domain knowledge.

In an embodiment, the method further includes: storing an upper threshold value and a lower threshold value per received signal for one or more of the received technical status data; comparing the received technical status data with the threshold values; and generating, irrespective of the evaluation by the anomaly detection module, an anomaly indicator for a particular received signal if the corresponding technical status data falls outside the interval defined by the respective upper and lower thresholds.

In an embodiment, the method further includes: learning the threshold values by the respective Machine Learning Models from the historic sensor data.

In an embodiment, a computer program product includes instructions that when loaded into a memory of the computer system and executed by at least one processor of the computer system cause the computer system to execute the steps of the computer-implemented method and to perform the functions of the computer system as disclosed.

Figure 1:
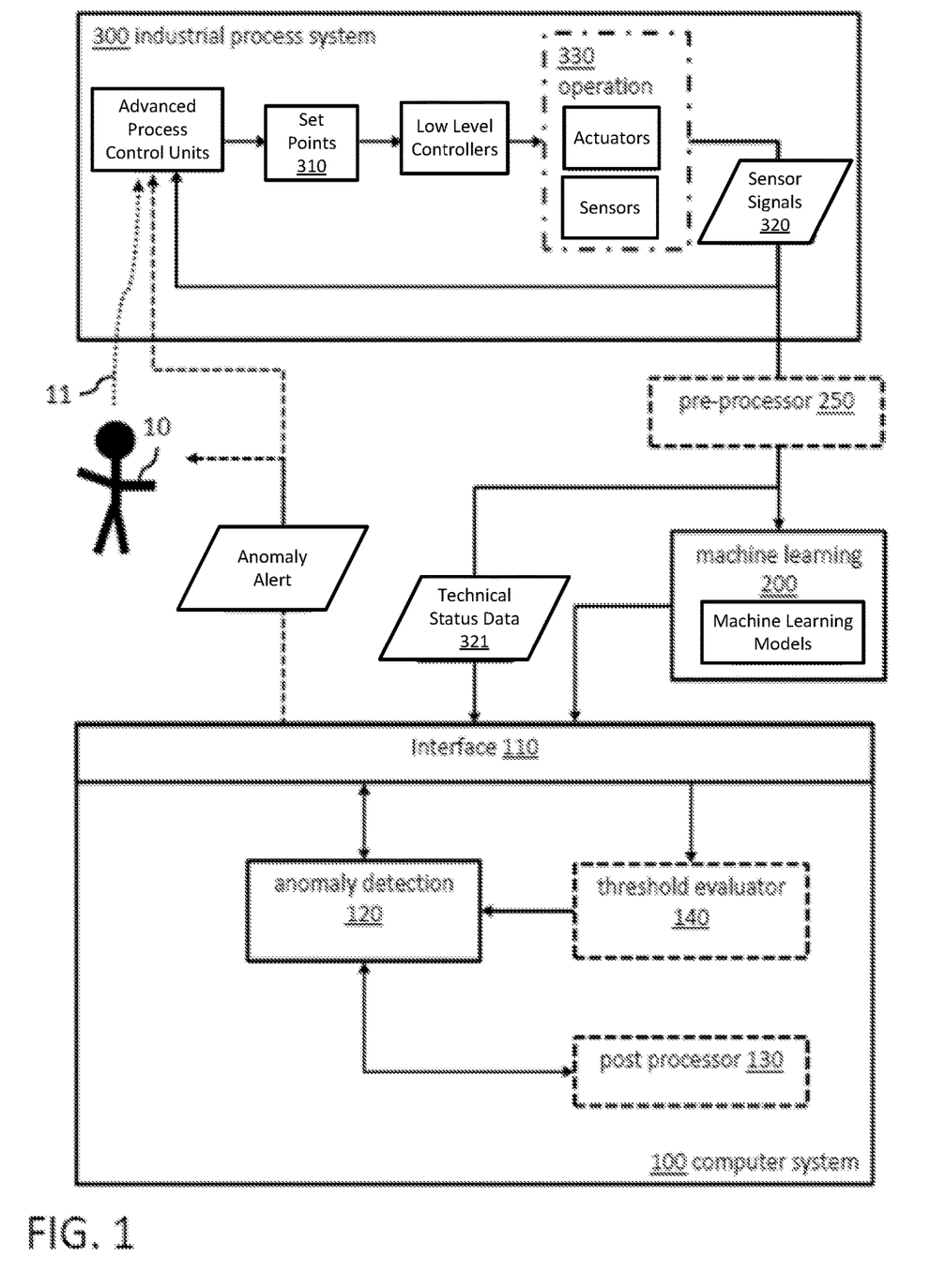
FIG. 1 shows a block diagram of a computer system monitoring the technical status of an industrial process system according to an embodiment.
Figure 2:
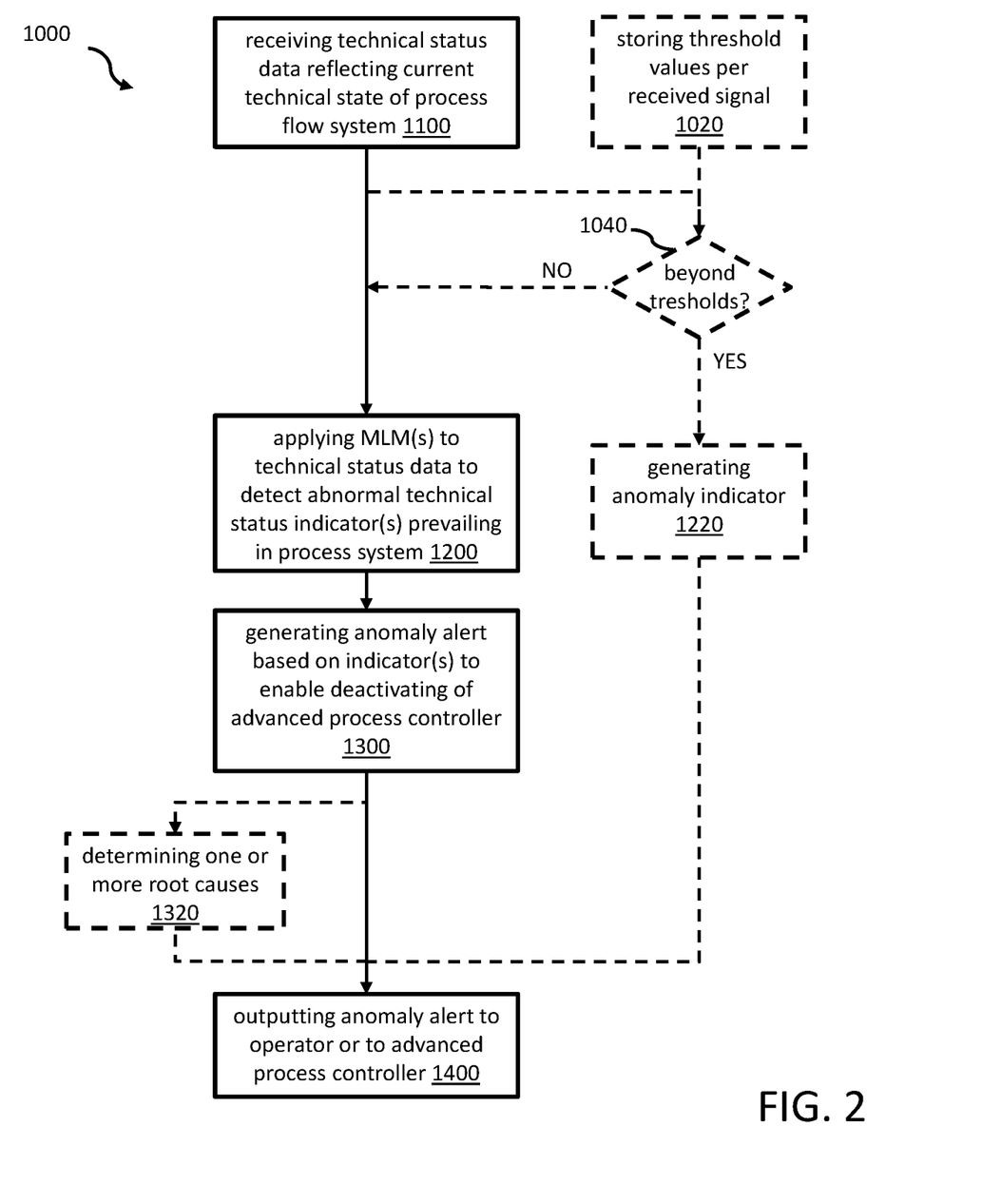
FIG. 2 is a flowchart of a computer-implemented method according to an embodiment.

FIG. 1 shows a block diagram of a computer system 100 for monitoring the technical status of an industrial process system 300 according to an embodiment. The computer system 100 and the industrial process system 300 are communicatively coupled via standard interface technology enabling the exchange of data between the two systems. For example, the two systems may be connected via a local area network (e.g., LAN, WLAN) or a wide area network (e.g., the Internet). FIG. 2 is a flowchart of a computer-implemented method 1000 for monitoring the technical status of the industrial process system 300 according to an embodiment. In the following description, functions performed by the computer system 100 are described in the context of the flow chart of FIG. 2. Therefore, the following description refers to reference numbers of FIG. 1 and FIG. 2.

In an embodiment, the industrial process system 300 is under control of an advanced process controller APC and has an operation part 330 for processing gas, liquid or solid flow materials. The operation 330 includes processing components, such as for example, actuators An, sensors Sn, piping, tanks, etc. as well as the processed materials. Examples of different types of industrial process systems were described earlier. The advanced process controller APC is responsive to one or more sensor signals 320. Signals to which the APC is responsive are referred to as the relevant signals herein. Typically, the APC is very sensitive with regards to the relevant signals and wrong sensor values received from one or more of the sensors Sn can lead to the computation of wrong set points 310 for the low level controllers LLC which control the actuators An. Such wrong set points 310 can take the proper operating of the industrial process system at risk because actuators receive inappropriate control instructions via the wrong set points leading to inappropriate behavior or functioning.

In other words, it is desirable to deactivate the APC in situations where the relevant signals 320 are at least partially corrupted so that a meaningful computation of the set points 310 becomes impossible. Corrupted signals stand for an abnormal technical status of the respective processing component or flow material. For example, a temperature sensor value may be totally wrong (e.g., much higher than the actual temperature) because the sensor is broken or de-calibrated and not because a respective heater is heating too much. A flow sensor may provide an actual flow value far below the desired flow value because a pipe or a valve is partially blocked and not because a respective pump is pumping at too low power. In both cases, the ABC would compute totally wrong set-points for the affected actuators (heater, pump). In such situations it is advantageous to deactivate the APC completely and let the LLCs continue to control the operation 330 because the control loop function is broken due to the wrong set point computation.

The computer system 100 can detect such anomalies regarding the technical status of the industrial process system 300. For this purpose, an interface module 110 of the computer system 100 receives 1100 technical status data 321 describing the current technical state of the industrial process system 300 with regards to a respective processing component or the processed material. Thereby, the technical status data 321 may correspond to the one or more sensor signals 320 or it may be derived from such signals 320. For example, from the raw sensor data 320, an optional pre-processor module 250 can derive over a time-period features such as, for example, average, max, min, variance, skewness, kurtosis, median, k-peaks, location of maximum, or location of minimum.

Further, the interface 110 receives from a machine learning module 200 one or more Machine Learning Models MLMn which are trained on historic raw or pre-processed sensor data. There are N models, and index n identifies a particular model. In case the received technical status data 321 corresponds to the raw sensor data/signals 320, the received Machine Learning Models are trained on historic raw sensor data. In case the received technical status data 321 corresponds to pre-processed sensor data, the received Machine Learning Models (MLM) are trained on historic pre-processed data wherein the same features were derived from the original sensor signals for both purposes: the training of the respective MLMn and the anomaly detection.

Figure 3A:
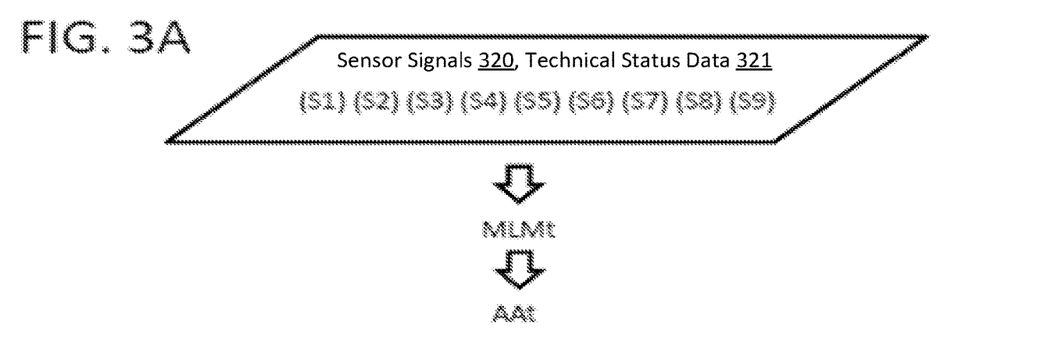
FIGS. 3A, 3B, 3C illustrate examples of anomaly alert generation according to an embodiment.
Figure 3B:
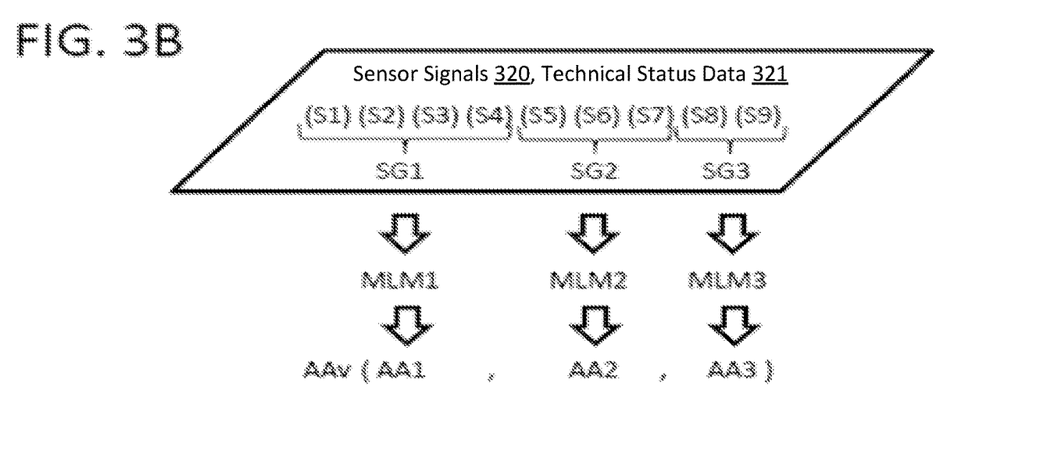
Figure 3C:
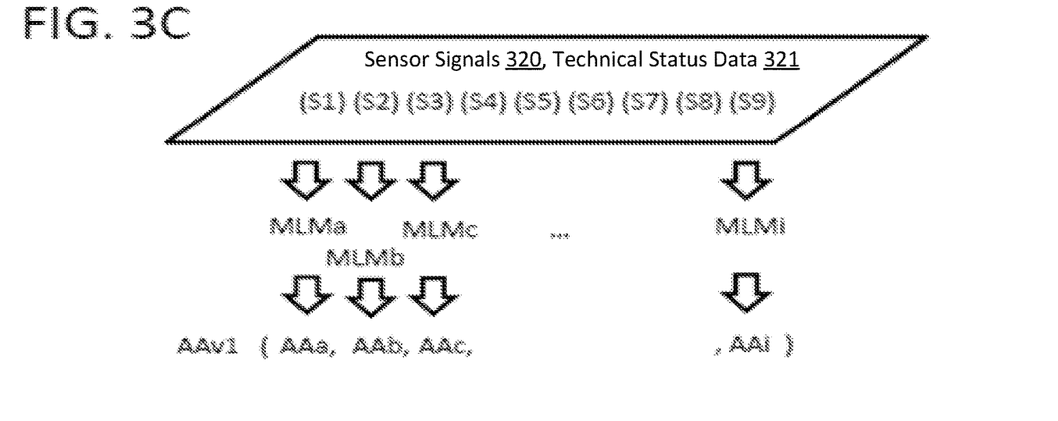

An anomaly detection module 120 of the computer system 100 applies 1200 the one or more Machine Learning Models MLMn to the received technical status data 321 to analyze the technical status data for detecting one or more indicators of an abnormal technical status prevailing in the industrial process system 300. FIGS. 3A to 3C illustrate details of different embodiments where different numbers of Machine Learning Models are used. When the application of a particular Machine Learning Model to the received technical status data detects an anomaly indicator the anomaly detection module generates an anomaly alert AA based on this indicator. If multiple Machine Learning Models are applied, each MLM can detect an anomaly indicator. In this case, the generated anomaly alert AA can include multiple anomaly indicators. In other words, the anomaly alert AA can be a vector with the various indicators as the vector elements. The anomaly detection analysis can be based on different algorithms which are well known in the context of machine learning. Examples for such algorithms include but are not limited to: k-nearest neighbor, local outlier detection, fuzzy logic based outlier detection, multi-variate Gaussian distribution, one-class support vector machine, replicator neural networks, self-organizing maps, deviations from association rules, and deviations from frequent item-sets.

The anomaly detection 120 then outputs 1400 the anomaly alert AA via the interface 110 to enable deactivating of the advanced process controller APC in case of an anomaly detection for the industrial process system. This includes in one embodiment to prompt an operator 10 of the industrial process system with the anomaly alert AA so that the operator takes corrective action 11 in deactivating the APC. In another embodiment, it includes to send the anomaly alert AA directly to the industrial process system in a machine readable format which can be executed by a computer-implemented control unit of the industrial process system 300 to automatically deactivate the APC in response to the anomaly alert AA.

In an embodiment, the disclosed computer system 100 is configured to prevent the APC from computing set-points for LLCs which take the industrial process system operation 330 at risk in response to sensor data 320 of low quality. This is achieved either fully automatically by instructing the industrial process system 300 to deactivate the APC in case of detected anomalies or indirectly by providing the anomaly alert to the operator 10 as a prompt for taking corrective action.

In an embodiment, the computer system 100 may further include a threshold evaluator module 140. The threshold evaluator 140 can store 1020 an upper threshold value and a lower threshold value per received technical status data for one or more of the received technical status data. For example, the threshold values may be predefined or they may be learned by the respective Machine Learning Models MLMn from the historic sensor data. Further, the threshold evaluator 140 can compare 1040 the received technical status data with the threshold values, and generate 1220, irrespective of the evaluation by the anomaly detection module 120, an anomaly indicator for a particular received technical status data if the technical status data falls outside the interval defined by the respective upper and lower thresholds. In the embodiment of the optional threshold evaluator 140 in FIG. 1 the threshold evaluator 140 provides the generated anomaly indicator to the anomaly detection module 120 where it is merged into the AA vector. In an alternative embodiment the threshold evaluator can provide the generated anomaly indicator directly to the interface 110 from where it can be provided as anomaly alert AA to the operator 10 or to the industrial process system 300.

The threshold evaluator 140 provides a shortcut to generate an anomaly indicator for a corresponding sensor signal by bypassing the anomaly detection function in cases where the anomaly is so large that the technical status data exceed predefined threshold values. As a consequence, in such situations the anomaly alert generation can be speeded up by avoiding the more time consuming computations on the basis of the corresponding Machine Learning Model(s). Further, the threshold evaluator automatically provides the root cause for the anomaly, namely the sensor signal causing the generation of the respective anomaly indicator. Root cause as used herein means the result of a drill down analysis to discover which is the processing component that is causing the detected anomaly.

Root cause analysis is also advantageous in embodiments where no threshold indicator is used or where the threshold indicator does not identify an anomaly based on the threshold values. When indicating one or more root causes for a detected anomaly to the operator 10, the operator can initiate the deactivation of the APC and take corrective action also with regards to the processing components which caused the detected anomaly. In one embodiment, the computer system 100 may further include a post-processor module 130 to determine 1320 one or more root causes amongst the received technical status data 321. In other words, the determined one or more root causes indicate the origin for the anomaly alert in the industrial process system allowing to take corrective action. Such root causes may be determined by different methods.

In an embodiment, a density based screening method may be used where technical status data samples showing anomalies are compared with samples showing no anomalies to identify the most deviating dimensions as root cause signals. A detailed example is described in the context of FIG. 4A.

In an embodiment, a scoring anomaly detection may be applied to groups of signals and/or single signals to generate a list of most likely root cause signals. Detailed examples are described in the context of FIGS. 4B, 4C. The group or single signals with highest anomaly scores are the most likely root cause signals.

FIGS. 3A, 3B, 3C illustrate examples of anomaly alert generation with different levels of granularity regarding root cause identification. As already disclosed, the anomaly detection can be applied to either the raw sensor data/signals 320 or to pre-processed technical status data 321 derived from such raw sensor data. Thereby, the used Machine Learning Models are trained on historic raw sensor data or historic pre-processed data, respectively.

In FIG. 3A, a single Machine Learning Model MLMt is applied to technical status data associated with nine sensor signals S1 to S9 of the industrial process system. In this case, a single anomaly alert AAt is generated in case the application of MLMt to the technical status data leads to the detection of a corresponding anomaly indicator. In this embodiment, MLMt knows about the dependencies and correlations of all involved sensor signals S1 to S9 which are learned during the training phase of MLMt. Therefore, the anomaly detection sensitivity is highest with regards to recognize an abnormal system behavior of the industrial process system operation because all signal dependencies are implicitly taken into account when applying MLMt to the sensor signals. This high anomaly detection sensitivity comes as a trade off with regards to the root cause identification granularity for the detected anomaly. From the detected anomaly the anomaly detection can only derive that the anomaly is caused by any one or any combination of S1 to S9 (i.e., the industrial process system in its entirety).

FIG. 3B illustrates an embodiment where multiple Machine Learning Models MLM1 to MLM3 are used. In this embodiment the received, technical status data is assigned to a plurality of signal groups SG1 to SG3 where each signal group is processed by a respective Machine Learning Model. In the example, S1 to S4 are assigned to SG1, S5 to S7 are assigned to SG2, and S8, S9 are assigned to SG3. MLM1 is applied to the technical status data of SG1 and can detect an anomaly indicator AA1 for anomalies detected in relation to the corresponding signals S1 to S4. MLM2 is applied to the technical status data of SG2 and can detect an anomaly indicator AA2 for anomalies detected in relation to the corresponding signals S5 to S7. MLM3 is applied to the technical status data of SG3 and can detect an anomaly indicator AA3 for anomalies detected in relation to the corresponding signals S8 and S9. Based on the anomaly indicators AA1 to AA3 the anomaly alert AAv is generated as a vector with each vector element AA1 to AA3 representing a group anomaly indicator for the respective signal group. Each vector element is determined by applying the respective group specific Machine Learning Model MLM1 to MLM3 to the technical status data assigned to the respective signal group. In this embodiment, root cause analysis is facilitated for the operator because each vector element of the anomaly alert vector AAv relates to a sub-set of the relevant signals. If any one of the vector elements indicates an anomaly the operator immediately knows that the origin of the anomaly is associated with any one or a combination of the signals associated with the technical status data assigned to the corresponding group. That is, the granularity of root cause identification is improved. As a trade-off, the sensitivity of the anomaly detection by the group specific Machine Learning Models is typically lower than the sensitivity of the single MLMt in FIG. 3A.

Efficient grouping criteria can be used to still achieve a high sensitivity per group specific Machine Learning Model and yet an improved granularity with regards to root cause identification. For example, signal groups may be defined by any one or more of the following grouping criteria: grouping based on physical location of the respective signals within the industrial process system, grouping of correlated signals identified by correlation analysis, and grouping of signals with dependencies as a result of domain knowledge.

Grouping based on physical location includes grouping of sensor signals which are in a defined physical neighborhood inside the industrial process system. Typically, such sensors will show some dependencies and/or correlations (e.g., a temperature sensor being in proximity to a heater, a flow meter being in proximity to a pump or tank, etc.) so that such a grouping can provide acceptable results regarding anomaly detection. Further, this grouping criterion provides immediate feedback to the operator about the potential physical location of the origin of the anomaly.

Grouping of correlated signals identified by correlation analysis ensures good anomaly detection results. The granularity with regards to root cause identification depends on the size of the signal groups. Typically, the more correlated signals are included in a group the better is the anomaly detection result but the lower is the root cause detection granularity.

Grouping of signals with dependencies as a result of domain knowledge typically is based on the knowledge of dependencies which exist in the processes performed by the industrial process system. Therefore, this embodiment typically leads to good anomaly detection results because of the known dependencies of the grouped signals and at the same time allows process related granularity of root cause identification. In other words, if one of the group specific Machine Learning Models results in an anomaly indicator the operator immediately knows which process in the industrial process system caused the anomaly.

FIG. 3C illustrates an embodiment where for each sensor signal S1 to S9 an associated Machine Learning Model MLMa to MLMi is provided. That is, each technical status data associated with a corresponding sensor signal is analyzed with regards to abnormal behavior in view of the patterns for the signal learned from the historic data behavior. In this embodiment the highest granularity with regards to root cause identification is achieved as for each signal a corresponding anomaly indicator AAa to AAi is computed as a vector element of the anomaly alert vector AAv1. If such an element shows an anomaly for the respective signal, the operator can retrieve the exact origin of the anomaly from the anomaly alert vector because there is a 1:1 correspondence between the respective signal and the corresponding anomaly indicator. However, in this embodiment the sensitivity of the anomaly detection is limited to abnormal behavior of a single signal. Dependencies between signals cannot be handled.

Figure 4A:
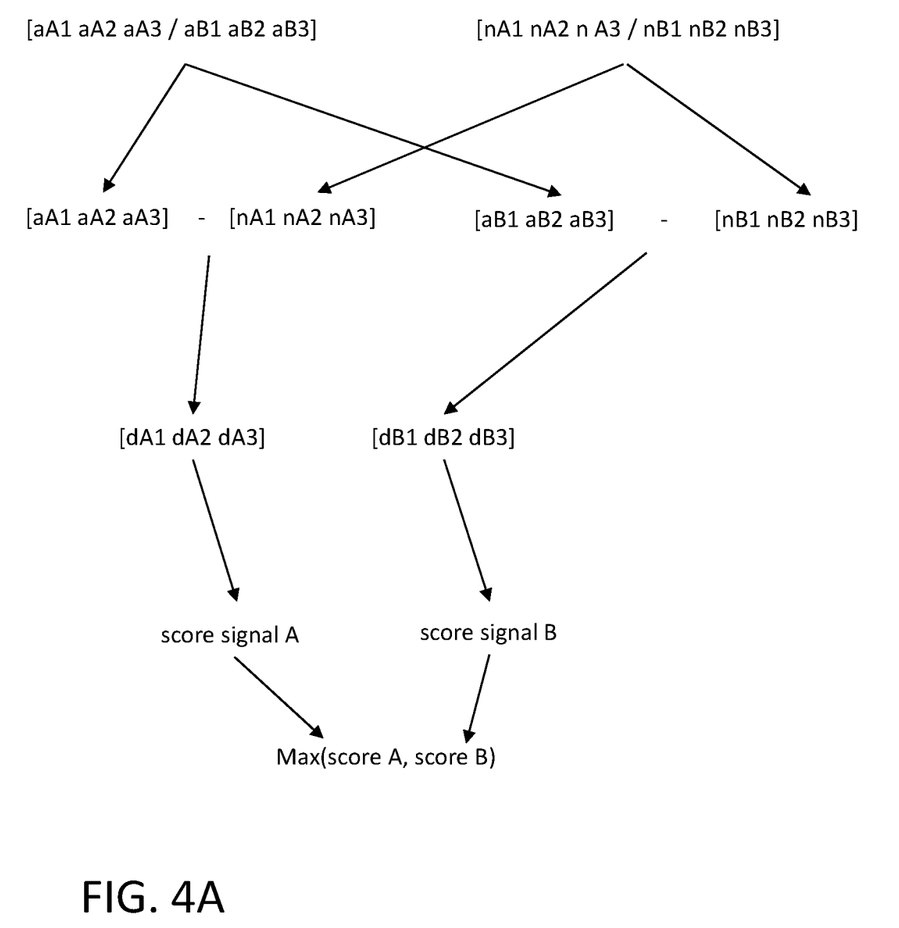
FIGS. 4A, 4B, 4C illustrate examples of post processor embodiments for root cause identification according to an embodiment.
Figure 4B:
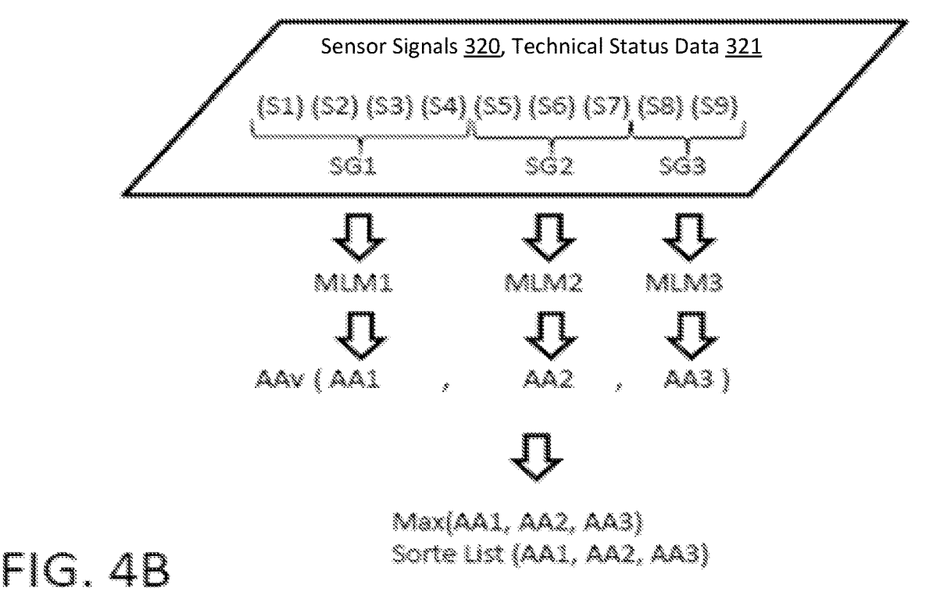
Figure 4C:
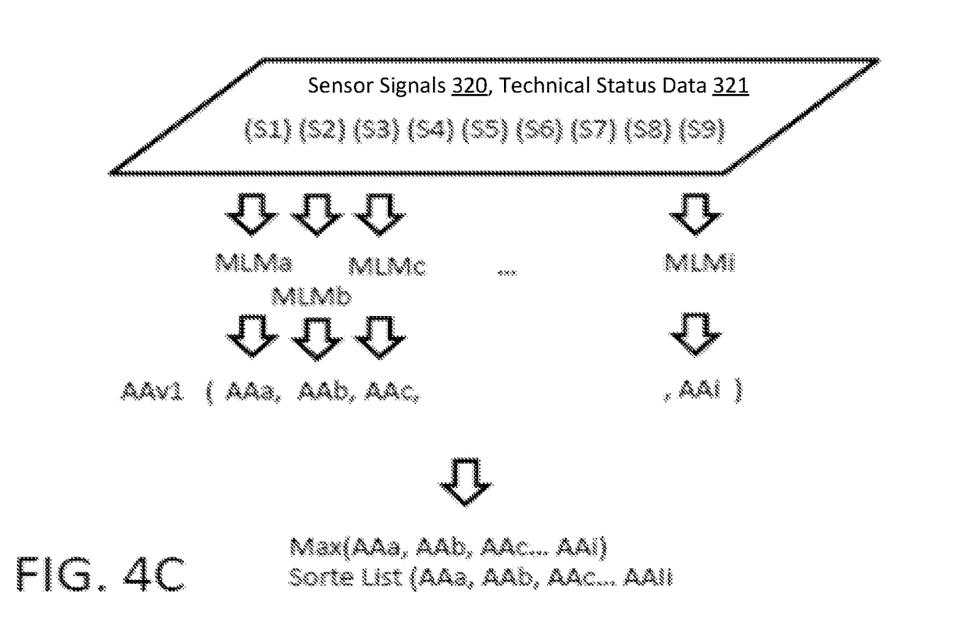

The post-processor module can overcome this disadvantage by combining the capabilities of high-sensitivity anomaly detection with high granularity in root cause identification. FIGS. 4A to 4C illustrate different embodiments of the post-processor function. FIG. 4A shows an embodiment for determining one or more root causes amongst the received technical status data using density based screening. Thereby, technical status data samples showing anomalies are compared with samples showing no anomalies to identify the most deviating dimensions as root cause signals. In the example, two signals A, B are sampled over multiple time intervals. For example, a signal value for each of the signals may be sampled every hour. In the example, for both signals the last three samples are analyzed. For signal A the last three samples are aA1, aA2 and aA3 showing a potential anomaly. For signal B the last three samples are aB1, aB2 and aB3 showing a potential anomaly. The post-processor knows corresponding normal series of samples for signals A and B: nA1, nA2, n A3 and nB1, nB2, nB3. The normal samples may correspond to historic data reflecting normal operation of the industrial process system in the past or they may be computed based on a model of the industrial process system which allows to simulate normal operation of the industrial process system. Such normal samples serve as reference samples for the comparison of potentially abnormal samples.

The post-processor now computes the distances dA1, dA2, dA3 between the normal and abnormal samples in the following way:

$$[dA1\ dA2\ dA3]=[aA1\ aA2\ aA3]-[nA1\ nA2\ nA3]$$

$$[dB1\ dB2\ dB3]=[aB1\ aB2\ aB3]-[nB1\ nB2\ nB3]$$

For both signals a deviation score (score signal A, score signal B) is computed. The maximum score Max(score A, score B) is likely the origin for the detected anomaly.

This density based screening approach can be used to post-process individual signals once the anomaly detection generates an anomaly alert. The alert may be generated with the highest sensitivity level (a single Machine Learning Model applied to all technical status data). The post-processor can then provide a more detailed root cause identification at the signal level by comparing the sampled technical status data which caused the anomaly alert with corresponding normal technical status data wherein comparing includes the application of a distance measure.

In following a specific numbers example for a comparison by distance of normal and abnormal samples is given for the two signals A, B. The example assumes two pre-processed sensor signals from which features, such as for example, average, max, min, variance, skewness, kurtosis, median, k-peaks, location of maximum, location of minimum are derived from the raw sensor data over a given time period. In the example, the last nine measurements (samples) are taken into account.

Normal data point: [A:(7,7,5,4,7,8,7,6,6), B:(10,12,14,11, 12,19,18,17,20,14)]

Abnormal data point: [A:(6,6,9,7,7,9,8,9,8), B:(8, 9,12, 9, 11, 7, 7,10, 9,12)]

Distance (absolute): [A:(1,1,4,3,0,1,1,3,2), B:(2, 3, 2, 2, 1, 12,11, 7,11, 2)]

Accumulated Deviation: score A: 16, score B: 53

This computation leads to the conclusion that B is likely the location/origin of the anomaly (root cause). Depending on the features, weighted sum or some other distance measure (e.g., Euclidian, Minkowski, Chebyshev, etc.) may be used to compute the distance between the normal and abnormal data points. If particular features are derived from two or more signals (e.g., via their cross-correlation, lag, etc.) the features averages can appear in the samples or be otherwise considered in the calculation of the accumulated deviation of the corresponding signals, optionally with a weight reflecting the importance of the signal for the feature.

FIG. 4B illustrates root cause identification by using anomaly scoring at signal group level. In this embodiment, an anomaly alert vector AAv was already generated as described in FIG. 3B. The post-processor now performs a scoring function on the vector elements (group anomaly indicators). Such a scoring function can be, for example, to determine the maximum value of the vector elements Max (AA1, AA2, AA3) or to sort the vector elements Sorte List (AA1, AA2, AA3) to provide to the operator a prioritized list of with regards to the signal groups which most likely caused the anomaly. FIG. 4C illustrates that the same anomaly scoring can be applied to the embodiment where anomaly detection is performed at the single signal level as disclosed in FIG. 3C. In this case the length of the anomaly alert vector AAv1 corresponds to the number of signals because for each signal a corresponding Machine Learning Model MLMa to MLMi was used to compute a respective anomaly indicator. That is, the scoring function is applied to AAv1 which provides an improved granularity to the operator for fast identification of the root cause.

Figure 5:
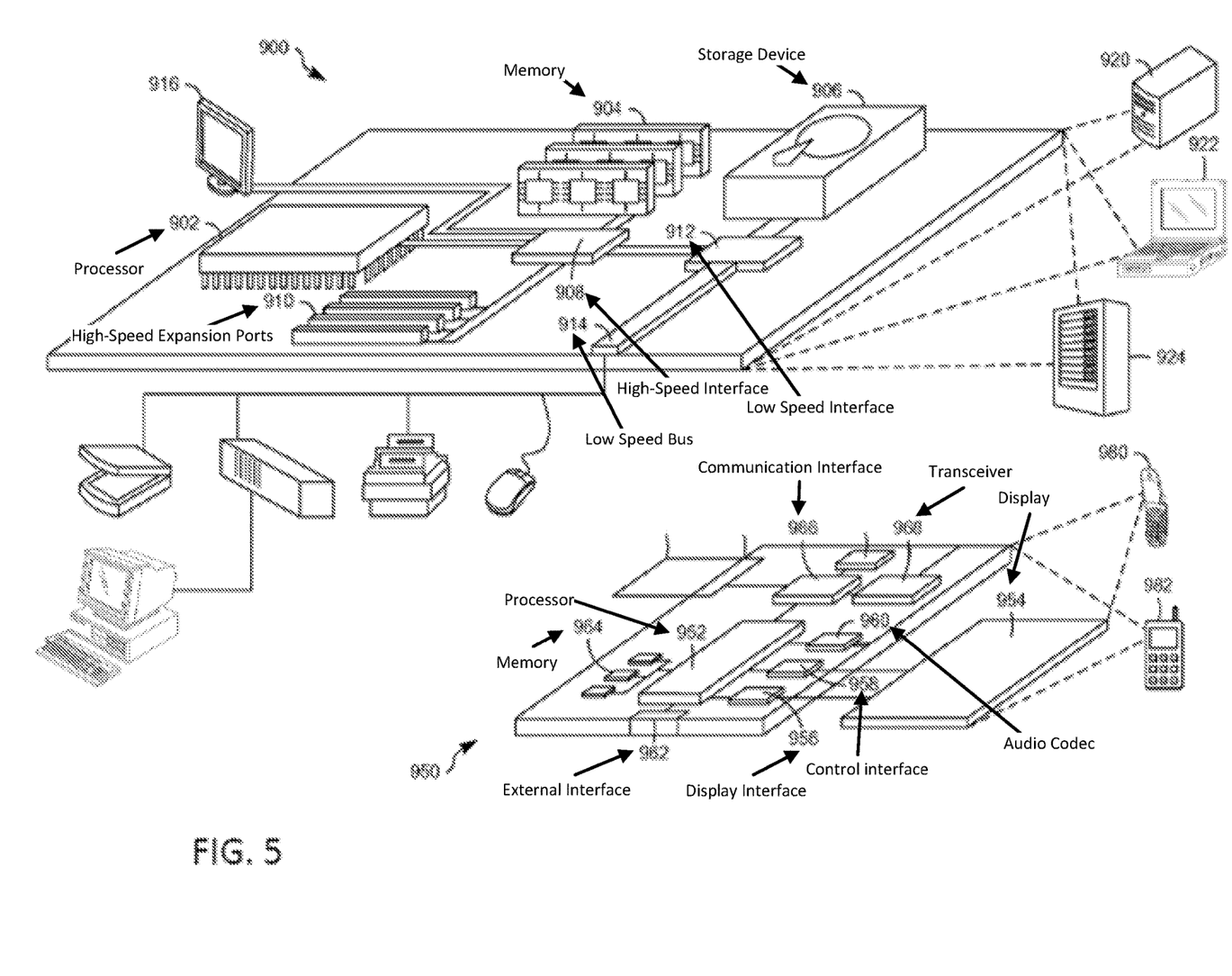
FIG. 5 is a diagram that shows an example of a generic computer device and a generic mobile computer device, which may be used to perform the techniques described herein.

FIG. 5 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to a computer system 100 as illustrated in FIG. 1. Computing device 950 is intended to represent various forms of mobile devices, such as personal digital assistants, cellular telephones, smart phones, and other similar computing devices. For example, computing device 950 may be used by an operator for communication with the computer system 100. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processing units and/or multiple buses may be used, as appropriate, along with multiple memories and types of memory. Also, multiple computing devices 900 may be connected, with each device providing portions of the necessary operations (e.g., as a server bank, a group of blade servers, or a processing device).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high-speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processing units. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, EDGE, UMTS, LTE, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a backend component (e.g., as a data server), or that includes a middleware component (e.g., an application server), or that includes a front end component (e.g., a client computer having a graphical user interface or a Web browser through which a user can interact with an implementation of the systems and techniques described here), or any combination of such backend, middleware, or frontend components. The components of the system can be interconnected by any form or medium of digital data communication (e.g., a communication network). Examples of communication networks include a local area network ("LAN"), a wireless local area network ("WLAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further aspects of the invention will be realized and attained by means of the elements and combinations particularly depicted in the appended claims. It is to be understood that both, the foregoing general description and the following detailed description are exemplary and explanatory only and are not restrictive of the invention as described.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer system for monitoring an industrial process system under control of an advanced process controller, the industrial process system having an operation part for processing flow materials, the advanced process controller being responsive to one or more sensor signals, the computer system comprising:
   one or more processors; and
   a non-transitory computer-readable medium having processor-executable instructions stored thereon, wherein the processor-executable instructions, when executed, facilitate:
   receiving technical status data describing a current technical state of the industrial process system associated with a respective processing component or a processed flow material, wherein the technical status data corresponds to or is derived from the one or more sensor signals;
   assigning the received the technical status data to one or more signal groups, wherein the one or more signal groups are defined by any one of the following grouping criteria:
      grouping based on physical location of the respective signals within the industrial process system,
      grouping of correlated signals identified by correlation analysis, or
      grouping of signals with dependencies as a result of domain knowledge;
   applying, based on the assigned one or more signal groups, a plurality of machine learning models to the received technical status data to analyze the technical status data for detecting one or more indicators of an abnormal technical status associated with the industrial process system, wherein the plurality of machine learning models are trained on historic raw or pre-processed sensor data;
   generating an anomaly alert based on the one or more indicator, wherein the generated anomaly alert is a vector with each vector element of the vector representing a group anomaly indicator for the respective assigned signal group, wherein each of the vector elements is determined by applying a respective group specific machine learning model from the plurality of machine learning models; and
   outputting the anomaly alert, wherein the anomaly alert is configured to enable deactivating of the advanced process controller in case of an anomaly detection for the industrial process system.

2. The computer system of claim 1, wherein the processor-executable instructions, when executed, further facilitate:
   determining one or more root causes within the received technical status data, wherein the one or more root causes indicates an origin for the anomaly alert in the industrial process system, and wherein determining the one or more root causes is based on any one of the following:
      density based screening where technical status data samples showing anomalies are compared with samples showing no anomalies to identify the most deviating dimensions as root cause signals; and
      scoring the anomaly detection applied to groups of signals and/or single signals to generate a list of most likely root cause signals.

3. The system of claim 1, wherein the applying the plurality of machine learning models to detect the one or more indicators of the abnormal technical status is based on any one of the following: k nearest neighbor, local outlier detection, fuzzy logic based outlier detection, multi-variate Gaussian distribution, one-class support vector machine, replicator neural networks, self-organizing maps, deviations from association rules, and deviations from frequent itemsets.

4. The system of claim 1, wherein the processor-executable instructions, when executed, further facilitate:

storing an upper threshold value and a lower threshold value per received technical status data for one or more of the received technical status data;
comparing the received technical status data with the threshold values; and
generating an anomaly indicator for a particular received technical status data based on the technical status data falling outside an interval defined by the upper and lower thresholds.

5. The system of claim 4, wherein the threshold values are predefined or learned by the respective group specific machine learning model from the historic sensor data.

6. A computer-implemented method for monitoring an industrial process system being under control of an advanced process controller, the advanced process controller being responsive to one or more sensor signals, comprising:
receiving technical status data describing a current technical state of the industrial process system associated with a respective processing component or a processed flow material, wherein the technical status data corresponds to or is derived from the one or more sensor signals;
assigning the received technical status data to one or more signal groups, wherein the one or more signal groups are defined by any one of the following grouping criteria:
grouping based on physical location of the respective signals within the industrial process system,
grouping of correlated signals identified by correlation analysis, or
grouping of signals with dependencies as a result of domain knowledge;
applying, based on the assigned one or more signal groups, a plurality of Machine Learning Models to the received technical status data to analyze the technical status data for detecting one or more indicators of an abnormal technical status associated with the industrial process system, wherein the plurality of Machine Learning Models are trained on historic raw or pre-processed sensor data;
generating an anomaly alert based on the one or more indicators, wherein the anomaly alert is configured to enable deactivating of the advanced process controller, wherein the generated anomaly alert is a vector with each vector element of the vector representing a group anomaly indicator for the respective assigned signal group, wherein each of the vector elements is determined by applying a respective group specific Machine Learning Model from the plurality of machine learning models; and
outputting the anomaly alert to an operator of the industrial process system or to the industrial process system.

7. The method of claim 6, further comprising:
determining one or more root causes within the received technical status data, wherein the one or more root causes indicates an origin for the anomaly alert in the industrial process system, and wherein determining the one or more root causes is based on any one of the following:
density based screening where sensor data samples showing anomalies are compared with samples showing no anomalies to identify the most deviating dimensions as root cause signals; and
scoring anomaly detection applied to groups of signals and/or single signals to generate a list of most likely root causes.

8. The method of claim 6, wherein the applying the plurality of machine learning models to detect the one or more indicators of the abnormal technical status is based on any one of the following: k-nearest neighbor, local outlier detection, fuzzy logic based outlier detection, multi-variate Gaussian distribution, one-class support vector machine, replicator neural networks, self-organizing maps, deviations from association rules, and deviations from frequent itemsets.

9. The method of claim 6, further comprising:
storing an upper threshold value and a lower threshold value per received technical status data for one or more of the received technical status data;
comparing the received technical status data with the threshold values; and
generating an anomaly indicator for a particular received technical status data based on the sensor data falling outside an interval defined by the respective upper and lower thresholds.

10. The method of claim 9, wherein the threshold values are predefined or learned by the respective group specific Machine Learning Models from the historic sensor data.

11. The method of claim 6, wherein the received technical status data comprises a plurality of sensor signals from a plurality of sensors, and wherein assigning the received technical status data to the one or more signal groups comprises grouping the plurality of sensor signals into a plurality of groups, wherein each of the plurality of groups comprises a subset of sensor signals from the plurality of sensor signals.

12. The method of claim 11, wherein the plurality of groups comprises a first subset of sensor signals and a second subset of sensor signals, and wherein applying the plurality of Machine Learning Models to the received technical status data comprises:
determining a first Machine Learning Model, from the plurality of Machine Learning Models, for the first subset of sensor signals; and
applying the first Machine Learning Model to the first subset of sensor signals to detect the one or more indicators of the abnormal technical status.

13. The method of claim 12, wherein applying the plurality of Machine Learning Models to the received technical status data comprises:
determining a second Machine Learning Model, from the plurality of Machine Learning Models, for the second subset of sensor signals, wherein the second Machine Learning Model is a different Machine Learning Model from the first Machine Learning Model; and
applying the second Machine Learning Model to the second subset of sensor signals to detect the one or more indicators of the abnormal technical status.

14. A non-transitory computer-readable medium having instructions stored thereon, wherein the instructions, when executed by at least one processor of a computing device, facilitate:
receiving technical status data describing a current technical state of an industrial process system associated with a respective processing component or a processed flow material, wherein the technical status data corresponds to or is derived from one or more sensor signals;
assigning the received technical status data to one or more signal groups, wherein the one or more signal groups are defined by any one of the following grouping criteria:
grouping based on physical location of the respective signals within the industrial process system, grouping of correlated signals identified by correlation analysis, or grouping of signals with dependencies as a result of domain knowledge;

applying, based on the assigned one or more signal groups, a plurality of Machine Learning Models to the received technical status data to analyze the technical status data for detecting one or more indicators of an abnormal technical status associated with the industrial process system, wherein the plurality of Machine Learning Models are trained on historic raw or pre-processed sensor data;

generating an anomaly alert based on the one or more indicators, wherein the anomaly alert is configured to enable deactivating of an advanced process controller, wherein the generated anomaly alert is a vector with each vector element of the vector representing a group anomaly indicator for the respective assigned signal group, wherein each of the vector elements is determined by applying a respective group specific Machine Learning Model from the plurality of machine learning models; and outputting the anomaly alert to an operator of the industrial process system or to the industrial process system.

* * * * *